US012051411B2

(12) United States Patent
Sawayanagi

(10) Patent No.: US 12,051,411 B2
(45) Date of Patent: *Jul. 30, 2024

(54) SPEECH SETTING SYSTEM, SPEECH SETTING ASSISTANCE DEVICE AND NON-TRANSITORY COMPUTER-READABLE RECORDING MEDIUM ENCODED WITH SPEECH SETTING ASSISTANCE PROGRAM

(71) Applicant: KONICA MINOLTA, INC., Tokyo (JP)

(72) Inventor: Kazumi Sawayanagi, Itami (JP)

(73) Assignee: KONICA MINOLTA, INC., Tokyo (JP)

(*) Notice: Subject to any disclaimer, the term of this patent is extended or adjusted under 35 U.S.C. 154(b) by 410 days.

This patent is subject to a terminal disclaimer.

(21) Appl. No.: 17/409,012

(22) Filed: Aug. 23, 2021

(65) Prior Publication Data
US 2022/0076673 A1 Mar. 10, 2022

(30) Foreign Application Priority Data
Sep. 8, 2020 (JP) ................................ 2020-150848

(51) Int. Cl.
*G10L 15/22* (2006.01)
(52) U.S. Cl.
CPC ........ *G10L 15/22* (2013.01); *G10L 2015/223* (2013.01); *G10L 2015/225* (2013.01)
(58) Field of Classification Search
CPC ......... G10L 15/22; G10L 15/00; G10L 15/01; G10L 15/06; G10L 15/08; G10L 15/18;
(Continued)

(56) References Cited

U.S. PATENT DOCUMENTS

2006/0103874 A1* 5/2006 Aoki .................. H04N 1/00973
358/1.15
2018/0285070 A1* 10/2018 Yoon ....................... G10L 15/22
(Continued)

FOREIGN PATENT DOCUMENTS

JP   H09115007 A   5/1997
JP   2003108182 A  4/2003
(Continued)

OTHER PUBLICATIONS

Decision of Refusal dated Oct. 31, 2023, issued in the corresponding Japanese Patent Application No. 2019-177406, 3 pages including 2 pages of English Translation.
(Continued)

*Primary Examiner* — Qi Han
(74) *Attorney, Agent, or Firm* — BUCHANAN INGERSOLL & ROONEY PC

(57) ABSTRACT

A speech setting system includes a job execution device that executes a job, for which a plurality of parameters are set, in accordance with the plurality of parameters and a speech setting assistance server, and the speech setting assistance server determines a plurality of parameters based on speech information obtained from a speech, determines utterance order of the plurality of parameters as output order, and outputs speech output information for outputting the plurality of parameters by speech in accordance with the output order.

15 Claims, 11 Drawing Sheets

(58) Field of Classification Search
CPC . G10L 15/1815; G10L 15/1822; G10L 15/20; G10L 15/26; G10L 15/30; G10L 2015/0631–0638; G10L 2015/221–228
USPC .... 704/270.1, 275, 270, 276, 231, 243, 251, 704/257, 258, 266
See application file for complete search history.

(56) References Cited

U.S. PATENT DOCUMENTS

2020/0349940 A1* 11/2020 Ko .................. H04L 67/125
2021/0099587 A1 4/2021 Minami

FOREIGN PATENT DOCUMENTS

| | | | |
|---|---|---|---|
| JP | 2003131773 A | 5/2003 |
| JP | 2004077601 A | 3/2004 |
| JP | 2006333365 A | 12/2006 |
| JP | 2009169139 A | 7/2009 |
| JP | 2011242594 A | 12/2011 |
| JP | 2013182171 A | 9/2013 |
| JP | 2019185734 A | 10/2019 |
| JP | 2020088830 A | 6/2020 |

OTHER PUBLICATIONS

Notice of Reasons for Refusal dated May 9, 2023, issued in the corresponding Japanese Patent Application No. 2019-177406, 9 pages including 5 pages of English Translation.
Notice of Reasons for Refusal dated Feb. 6, 2024, issued in the corresponding Japanese Patent Application No. 2020-150848, 11 pages including 6 pages of English Translation.

* cited by examiner

FIG. 7

LIST OF PARAMETERS

| JOB TYPE | SETTING ITEM | PARAMETERS |
|---|---|---|
| COPY | COLOR | BLACK & WHITE/AUTO COLOR/FULL COLOR |
| | SCAN | BOTH SIDES/ONE SIDE |
| | PRINT | BOTH SIDES/ONE SIDE |
| | STAPLE | TWO LOCATIONS/CORNER/NONE |
| | NUMBER OF COPIES | 1, 2, 3···(NUMERALS) |
| | TWO PAGES PER SHEET | ON/OFF |
| | PAPER SIZE | A4/A3/LETTER/LEGER |
| SCAN | RESOLUTION | 200dpi／300dpi／400dpi／600dpi |
| | DESTINATION | TAKAHASHI, MINAMI, TANAKA···(CHARACTER STRINGS) |
| | COLOR | BLACK & WHITE/AUTO COLOR/FULL COLOR |
| | SCAN SIZE | A4/A3/LETTER/LEGER |
| | SCAN | BOTH SIDES/ONE SIDE |
| | FORMAT | COMPACTPDF／PDF／JPEG／TIFF |

FIG. 8

SETTING INSTRUCTION COMMAND

```
{
  "intent":"create_copy_job",
  "parameter":{
    "duplux":null,
    "color":"full_color",
    "number":"3",
    "combine":"two pages per sheet"
  }
}
```

SPEECH SETTING SYSTEM, SPEECH SETTING ASSISTANCE DEVICE AND NON-TRANSITORY COMPUTER-READABLE RECORDING MEDIUM ENCODED WITH SPEECH SETTING ASSISTANCE PROGRAM

The entire disclosure of Japanese patent Application No. 2020-150848 filed on Sep. 8, 2020, is incorporated herein by reference in its entirety.

BACKGROUND

Technological Field

The present invention relates to a speech setting system, a speech setting assistance device and a non-transitory computer-readable recording medium encoded with a speech setting assistance program. In particular, the present invention relates to a speech setting system that sets a job to be executed by a job execution device based on a speech, a speech setting assistance device included in the speech setting system and a non-transitory computer-readable recording medium encoded with a speech setting assistance program to be executed in the speech setting assistance device.

Description of the Related Art

Generally, a Multi Function Peripheral (hereinafter referred to as an MFP) is placed in an office. A user causes the MFP to execute a job that defines a process of printing image data, copying a document, scanning a document, storing image data, transmitting image data or the like. The technology for setting parameters by speech in regard to a job set in the MFP has been known.

For example, Japan Patent Laid-Open No. 2019-185734 describes an information processing system that includes an external device and an information processing apparatus, and includes an acquirer that acquires speech information for operating the external device, a speech recognizer that recognizes the speech information, an extractor that extracts instruction information representing an information process of instructing the external device based on a result of recognition of the speech information by the speech recognizer, a converter that converts the instruction information into operational information in an information form that is interpretable by the external device, and an outputter that outputs the operational information to the external device.

Further, technology for notifying a user of the content of setting by speech to enable the user to confirm the content set in an MFP by speech has been known. For example, Japan Patent Laid-Open No. 2009-169139 describes a voice recognition device that recognizes a character string spoken by a user and outputs a voice, which reads out the character string recognized as talk-back voice, and is characterized in having a voice recognition unit configured to recognize a character string spoken by the user, an articulation delimiting points detecting unit configured to detect a delimiting point of articulation in the character string spoken by the use, and a talk-back voice output unit configured to output a voice, which reads out the character string recognized by the voice recognition unit in a manner such that the recognized character string is delimited at points corresponding to the delimiting points of articulation detected by the articulation delimiting points detecting unit, as the talk-back voice.

However, it may be difficult for a user to confirm the content of setting due to the difference between the information obtained by speech and the information with which comparison is made in the case where the user confirms the content of setting while hearing a plurality of parameters produced by speech. Therefore, the user may not be able to properly hear or may miss the content of setting output by speech. In this case, the user may have to rehear the content of setting, or a process may be executed with the user not noticing an error in content of setting. Further, the user may perform setting again in spite of correct setting. As a result, a setting error may occur, and there is a problem that efficiency of setting work is degraded.

SUMMARY

According to one aspect of the present invention, a speech setting system includes a job execution device that executes a job for which a plurality of parameters are set in accordance with the plurality of parameters, and a speech setting assistance device, and the speech setting assistance device includes a hardware processor, wherein the hardware processor determines the plurality of parameters based on speech information obtained from a speech, determines utterance order of the plurality of parameters as output order, and outputs speech output information for outputting the plurality of parameters by speech in accordance with the output order.

According to another aspect of the present invention, a speech setting assistance device sets parameters in a job execution device that executes a job, for which the plurality of parameters are set, in accordance with the plurality of parameters, and includes a hardware processor, wherein the hardware processor determines the plurality of parameters based on speech information obtained from a speech, determines utterance order of the plurality of parameters as output order, and outputs speech output information for outputting the plurality of parameters by speech in accordance with the output order.

According to yet another aspect of the present invention, a non-transitory computer-readable recording medium is encoded with a speech setting assistance program executed by a computer that controls a speech setting assistance device for setting a plurality of parameters in a job execution device that executes a job for which the plurality of parameters are set in accordance with the plurality of parameters, and the speech setting assistance program causes the computer to perform a parameter determining step of determining the plurality of parameters based on speech information obtained from a speech, an output order determining step of determining utterance order of the plurality of parameters as output order, and an output control step of outputting speech output information for outputting the plurality of parameters by speech in accordance with the output order.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 7 is a diagram showing one example of a parameter table;

FIG. 8 is a diagram showing one example of a setting instruction command;

DETAILED DESCRIPTION OF EMBODIMENTS

Figure 1:
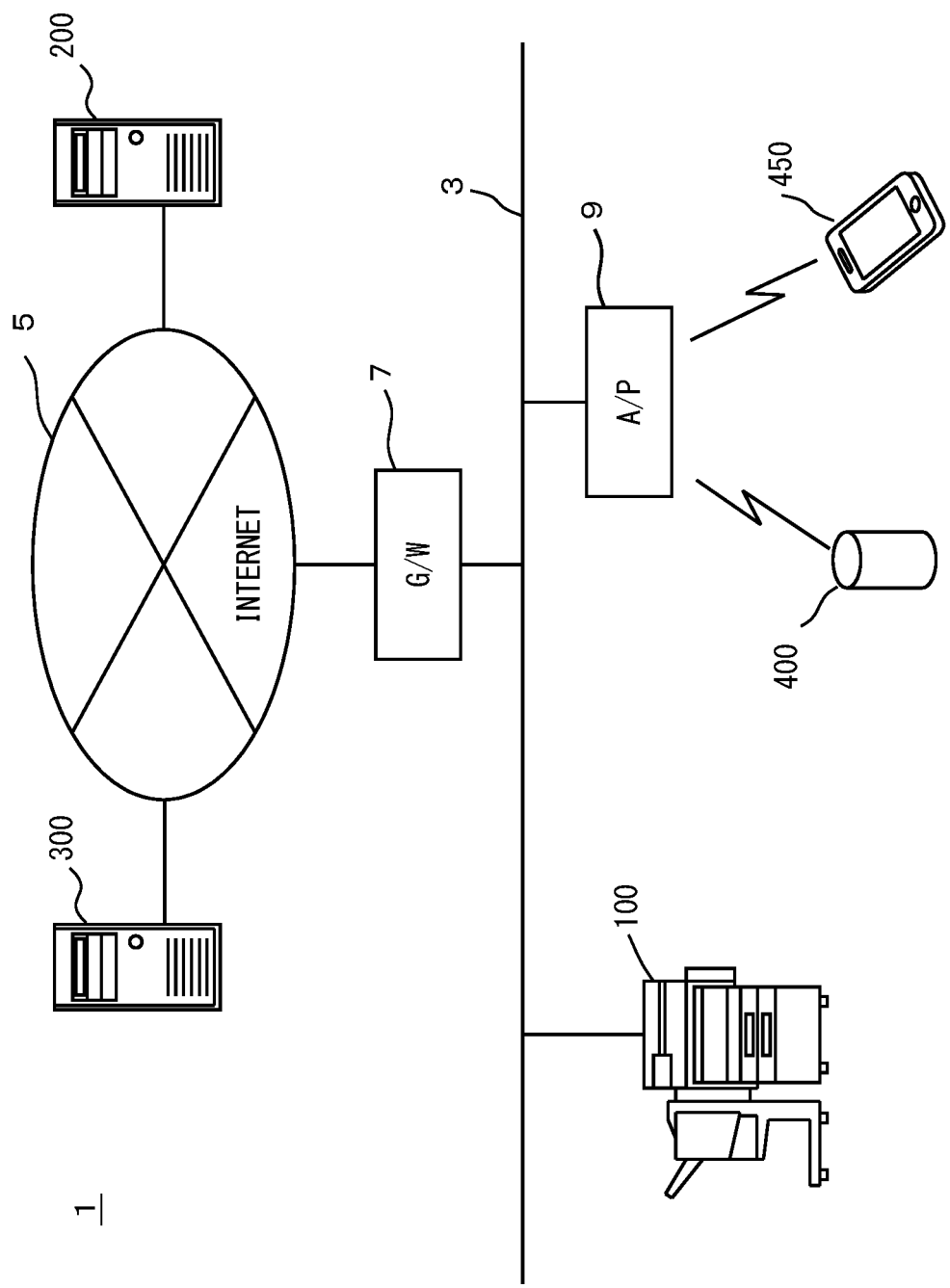
FIG. 1 is a diagram showing an overview of a speech setting system in one embodiment of the present invention.

Hereinafter, one or more embodiments of the present invention will be described with reference to the drawings. However, the scope of the invention is not limited to the disclosed embodiments.

Embodiments of the present invention will be described below with reference to the drawings. In the following description, the same parts are denoted with the same reference characters. Their names and functions are also the same. Thus, a detailed description thereof will not be repeated.

FIG. 1 is a diagram showing the overview of a speech setting system in one embodiment of the present embodiment. Referring to FIG. 1, the speech setting system 1 includes an MFP (Multi Function Peripheral) 100, a speech setting assistance server 200, a speech information generation server 300, a smart speaker 400 and a portable information device 450. The smart speaker 400 is placed in a predetermined distance from the MFP 100. The predetermined distance is preferably the distance at which the smart speaker 400 can collect the sound of a speech, which a user utters while viewing an operation panel of the MFP 100. The smart speaker 400 may be placed next to the MFP 100.

The MFP 100 is one example of a job execution device. The MFP 100 is connected to a network 3. The network 3 is a local area network (LAN), for example. The network 3 may be either wired or wireless. Further, the network 3 may be a wide area network (WAN), a public switched telephone network (PSTN), the Internet or the like.

An access point (AP) 9 is connected to the network 3. The AP 9 is a relay device having a wireless communication function. The smart speaker 400 is connected to the network 3 by communicating with the AP 9.

The portable information device 450 is a computer carried by the user such as a smartphone, a tablet terminal or a PDA (Personal Digital Assistant). The portable information device 450 can be connected to the network 3 by wirelessly communicating with the AP 9.

A gateway (G/W) device 7 is connected to the network 3 and the Internet 5. The gateway device 7 relays the communication between the network 3 and the Internet 5. The speech setting assistance server 200 and the speech information generation server 300 are connected to the Internet 5. Therefore, the MFP 100, the smart speaker 400 and the portable information device 450 can respectively communicate with the speech setting assistance server 200 or the speech information generation server 300 via the gateway device 7. Further, the speech setting assistance server 200 and the speech information generation server 300 can communicate with each other via the Internet 5.

The speech information generation server 300 provides a service of virtual assistant with the smart speaker 400 or the portable information device 450 as a user interface. Therefore, the user can have a conversation with the smart speaker 400 or the portable information device 450. The virtual assistant is also referred to as an AI (Artificial Intelligence) assistant and is well-known technology. Each of the smart speaker 400 and the portable information device 450 has a microphone, a speaker and a communication function. The speech information generation server 300 receives a user's speech collected by the smart speaker 400 or the portable information device 450, and controls the smart speaker 400 or the portable information device 450 to cause the smart speaker 400 or the portable information device 450 to utter a speech. The speech information generation server 300 has a function of performing natural language processing based on a speech. The speech information generation server 300 may have a learning function using AI technology including machine learning for the natural language processing.

In the speech setting system 1 in the present embodiment, the user can set a job in the MFP 100 by speech using the service of virtual assistant provided by the speech information generation server 300. The speech setting assistance server 200 is placed between the MFP 100 to be controlled and the speech information generation server 300 that provides the service of virtual assistant. The speech setting assistance server 200 controls the MFP 100.

Specifically, the smart speaker 400 or the portable information device 450, and a device to be controlled are registered in the speech information generation server 300. Although the device to be controlled is the MFP 100, because the speech setting assistance server 200 controls the MFP 100 here, the speech setting assistance server 200 is registered as the device to be controlled instead of the MFP 100 in the speech information generation server 300. Because the function of the smart speaker 400 and the function of the portable information device 450 are the same, the function of the smart speaker 400 will be described here, by way of example.

For example, in the speech setting system 1, an authentication server can be provided in order to associate the smart speaker 400 with the MFP 100. The speech setting assistance server 200 may have the function of the authentication server. Specifically, the authentication server issues a password in response to a request including an identification ID from the MFP 100. An administrator who administers the MFP 100 operates the MFP 100 and requests the authentication server to issue a password. The administrator operates a personal computer or the like, accesses the speech information generation server 300, associates the smart speaker 400 with the MFP 100 and registers the authentication server. A registration operation is an operation of associating the URL (Uniform Resource Locator) of the smart speaker with the identification ID of the MFP 100 and the password.

When the smart speaker 400 is associated with the MFP 100, the speech information generation server 300 requests the authentication server to issue an authentication token. Specifically, when the speech information generation server 300 transmits an issuance request including the identification ID of the MFP 100 and the password to the authentication server, if the identification information and the password are registered, the authentication server issues an authentication token and returns the authentication token to the speech information generation server 300. After receiving the authentication token with respect to the MFP 100, the speech information generation server 300 transmits speech information that is generated based on a speech collected by the smart speaker 400 to the speech setting assistance server 200 together with the authentication token of the MFP 100.

The speech setting assistance server 200 transmits the authentication token to the authentication server. Because the authentication server that receives the authentication token returns the identification ID of the MFP 100 corresponding to the authentication token, the speech setting assistance server 200 can specify the MFP 100 based on the identification ID.

Further, keywords that are prepared in advance as the information for extracting information for controlling the MFP 100 from a speech are registered in the speech information generation server 300. The keywords are the information in regard to parameters that are set for execution of jobs by the MFP 100 which is to be controlled. Specifically, the keywords include job types and parameters used by the MFP 100 for execution of jobs. The parameters are the values set for each of a plurality of setting items defined for each job type. The speech information generation server 300 extracts information for controlling the MFP 100 from a speech uttered by the user, generates speech information including the extracted information and outputs the speech information to the speech setting assistance server 200. A parsing rule may be registered in the speech information generation server 300 for extraction of keywords from a speech.

For example, the user utters a word, which is prepared in advance to specify the MFP 100 that is to be controlled, such as the name assigned to the MFP 100 to the smart speaker 400. In this case, reference is made to the keywords registered in association with the MFP 100 in the speech information generation server 300, and speech information is generated. The speech information generation server 300 transmits the generated speech information and device identification information for identifying the smart speaker 400 that has transmitted speech data to the speech setting assistance server 200. Here, character information is used in the speech information. The speech information is not limited to the character information but may be a speech or a code.

The name assigned to the MFP 100 is "Bizhub," by way of example. In the case where the user utters "Use Bizhub and make three copies of two pages per sheet in color," speech information is transmitted to the speech information generation server 300. The speech information generation server 300 specifies the MFP 100 based on the word "Bizhub," and extracts the words "three," "two pages per sheet," "color" and "copies" with reference to the keywords stored in the MFP 100 in advance. Then, the speech information generation server 300 determines that the job type is 'COPY' based on the word "copies" in accordance with the parsing rule, determines that "three," "two pages per sheet" and "color" are parameters, and generates speech information including them. Then, the speech information generation server 300 transmits the speech information to the speech setting assistance server 200.

Figure 2:
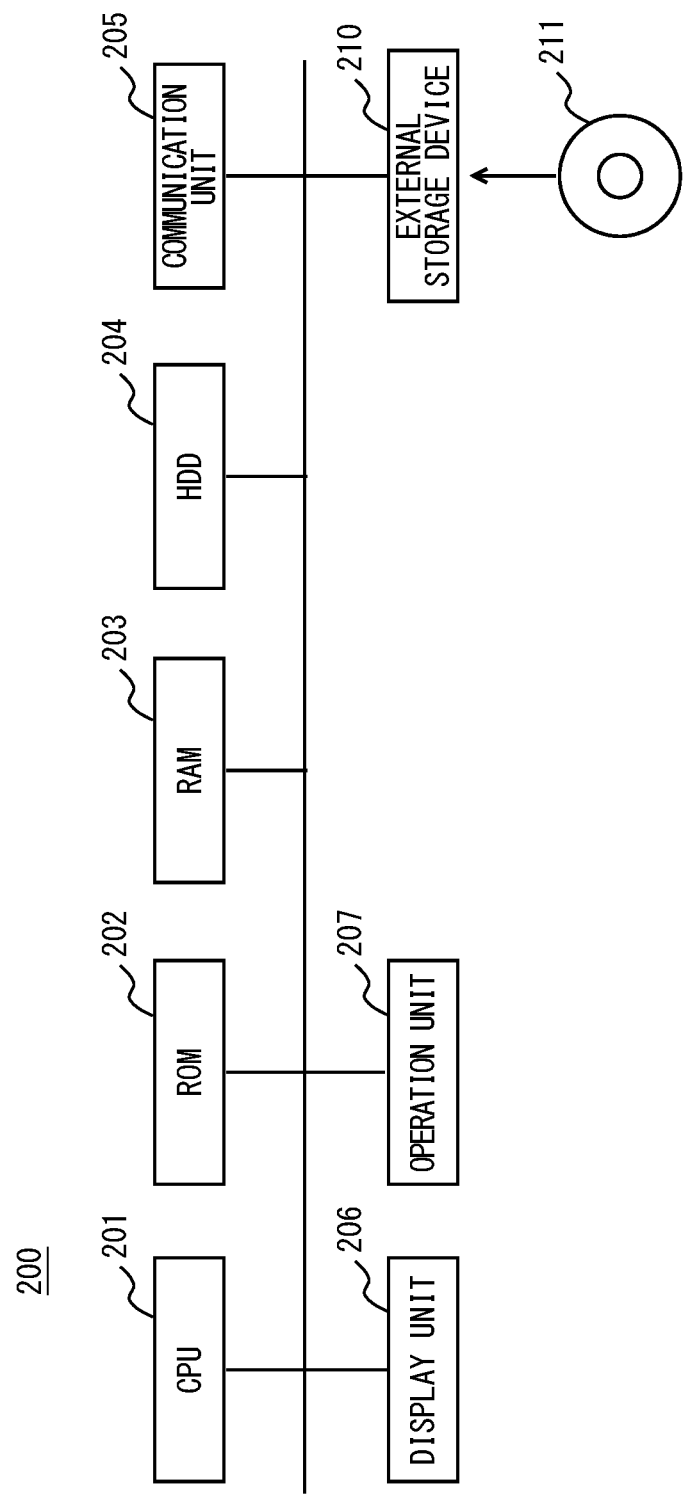
FIG. 2 is a block diagram showing one example of the outline of the hardware configuration of a speech setting assistance server.

FIG. 2 is a block diagram showing one example of the outline of the hardware configuration of the speech setting assistance server. Referring to FIG. 2, the speech setting assistance server 200 includes a CPU (Central Processing Unit) 201 for controlling the speech setting assistance server 200 as a whole, a ROM (Read Only Memory) 202 for storing a program to be executed by the CPU 201, a RAM (Random Access Memory) 203 that is used as a work area for the CPU 201, a Hard Disc Drive (HDD) 204 for storing data in a non-volatile manner, a communication unit 205 that connects the CPU 201 to the network 3, a display unit 206 that displays information, an operation unit 207 that receives input by a user's operation and an external storage device 210.

The CPU 201 downloads a program from a computer connected to the Internet 5 and stores the program in the HDD 204. Further, in the case where the computer connected to the network 3 writes the program in the HDD 204, the program is stored in the HDD 204. The CPU 201 loads the program stored in the HDD 204 into the RAM 203 for execution.

The external storage device 210 is mounted with a CD-ROM (Compact Disk Read Only Memory) 211. In the present embodiment, the CPU 201 executes a program stored in the ROM 202 or the HDD 204, by way of example. However, the CPU 201 may control the external storage device 210, read the program to be executed by the CPU 201 from the CD-ROM 211 and store the read program in the RAM 203 for execution.

A recording medium for storing a program to be executed by the CPU 201 is not limited to the CD-ROM 211 but may be a flexible disc, a cassette tape, an optical disc (MO (Magnetic Optical Disc)/MD(Mini Disc)/DVD(Digital Versatile Disc)), an IC card, an optical card, or a semiconductor memory such as a mask ROM or an EPROM (Erasable Programmable ROM). The program referred to here includes not only a program directly executable by the CPU 201 but also a source program, a compressed program, an encrypted program and the like.

Figure 3:
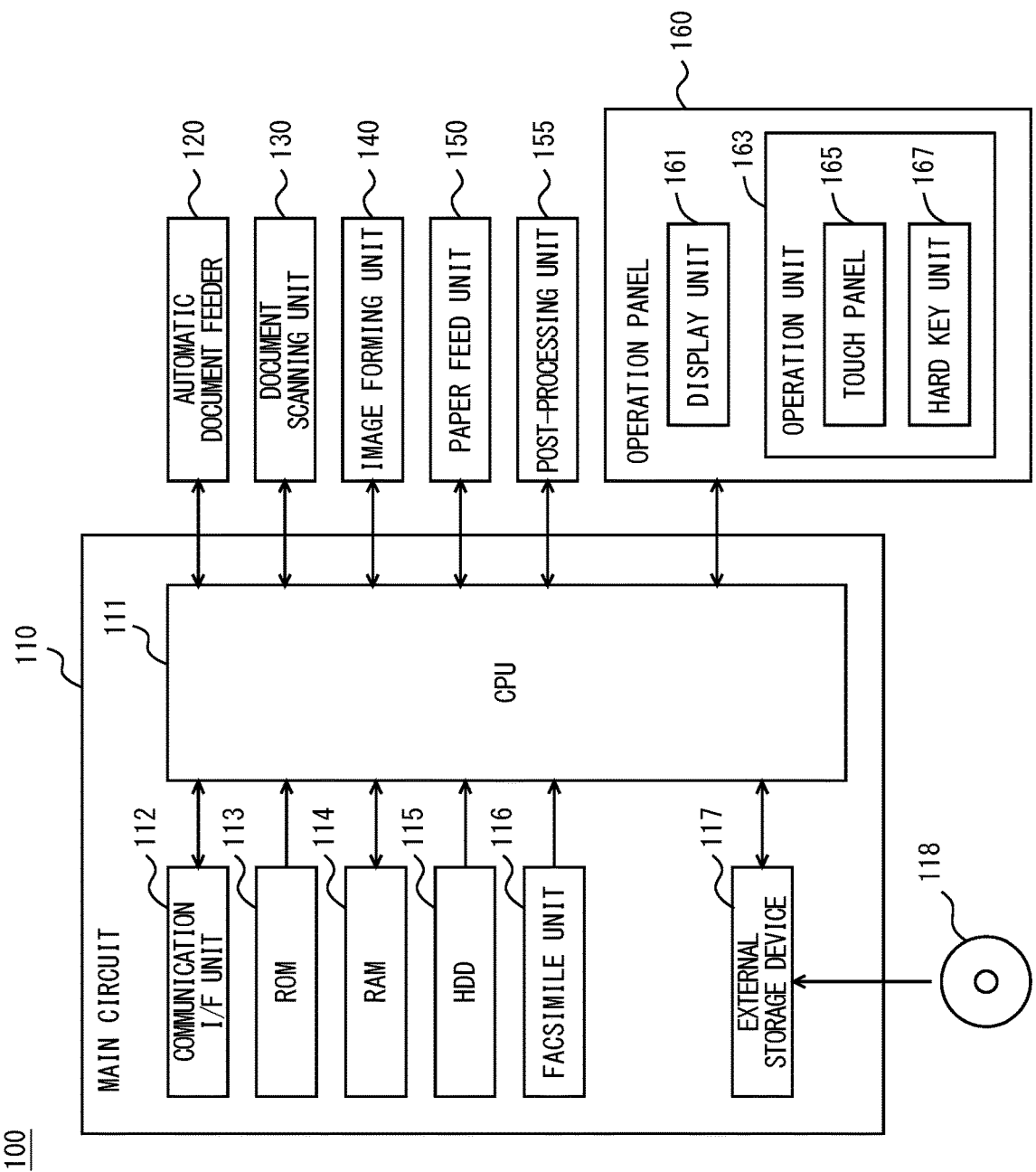
FIG. 3 is a block diagram showing the outline of the hardware configuration of an MFP.

FIG. 3 is a block diagram showing the outline of the hardware configuration of the MFP. Referring to FIG. 3, the MFP 100 includes a main circuit 110, a document scanning unit 130 for scanning a document, an automatic document feeder 120 for conveying a document to the document scanning unit 130, an image forming unit 140 for forming an image on a paper (a sheet of paper) or other medium based on image data output by the document scanning unit 130 that has scanned a document, a paper feed unit 150 for supplying a paper to the image forming unit 140, a post-processing unit 155 for processing a paper on which an image is formed, and an operation panel 160 serving as a user interface.

The post-processing unit 155 performs a sorting process of sorting and discharging one or more papers on which images are formed by the image forming unit 140, a hole-punching process of punching the papers and a stapling process of stapling the papers.

The main circuit 110 includes a CPU 111, a communication interface (I/F) 112, a ROM 113, a RAM 114, a Hard Disc Drive (HDD) 115 that is used as a mass storage device, a facsimile unit 116 and an external storage device 117 mounted with the CD-ROM 118. The CPU 111 is connected to the automatic document feeder 120, the document scanning unit 130, the image forming unit 140, the paper feed unit 150, the post-processing unit 155 and the operation panel 160 to control the MFP 100 as a whole.

The ROM 113 stores a program to be executed by the CPU 111 or data required for execution of the program. The RAM 114 is used as a work area when the CPU 111 executes the program. Further, the RAM 114 temporarily stores image data successively transmitted from the document scanning unit 130.

The communication I/F unit 112 is an interface for connecting the MFP 100 to the network 3. The CPU 111 communicates with the smart speaker 400 via the communication I/F unit 112, and transmits and receives data. Further, the communication I/F unit 112 can communicate with a computer connected to the Internet 5 via the network 3.

The facsimile unit 116 is connected to the Public Switched Telephone Network (PSTN), transmits facsimile data to the PSTN or receives facsimile data from the PSTN. The facsimile unit 116 stores the received facsimile data in the HDD 115 or outputs the received facsimile data to the image forming unit 140. The image forming unit 140 prints the facsimile data received by the facsimile unit 116 on a paper. Further, the facsimile unit 116 converts the data stored in the HDD 115 into facsimile data and transmits the converted facsimile data to a facsimile machine connected to the PSTN.

The external storage device 117 is mounted with the CD-ROM 118. The CPU 111 can access the CD-ROM 118 via the external storage device 117. The CPU 111 loads the program recorded in the CD-ROM 118, which is mounted on the external storage device 117, into the RAM 114 for execution. A medium for storing a program to be executed by the CPU 111 is not limited to the CD-ROM 118 but may be an optical disc, an IC card, an optical card or a semiconductor memory such as a mask ROM or an EPROM.

Further, the program to be executed by the CPU 111 is not restricted to a program recorded in the CD-ROM 118, and the CPU 111 may load a program, stored in the HDD 115, into RAM 114 for execution. In this case, another computer connected to the network 3 may rewrite the program stored in the HDD 115 of the MFP 100 or may additionally write a new program therein. Further, the MFP 100 may download a program from another computer connected to the network 3 and store the program in the HDD 115. The program referred to here includes not only a program directly executable by the CPU 111 but also a source program, a compressed program, an encrypted program and the like.

The operation panel 160 is provided on an upper surface of the MFP 100 and includes a display unit 161 and an operation unit 163. The display unit 161 is a Liquid Crystal Display (LCD) or an organic EL (Electroluminescence) display, for example, and displays instruction menus to users, information about the acquired image data and the like. The operation unit 163 includes a touch panel 165 and a hard key unit 167. The touch panel 165 is superimposed on the upper surface or the lower surface of the display unit 161. The hard key unit 167 includes a plurality of hard keys. The hard keys are contact switches, for example. The touch panel 165 detects the position designated by the user on the display surface of the display unit 161.

Figure 4:
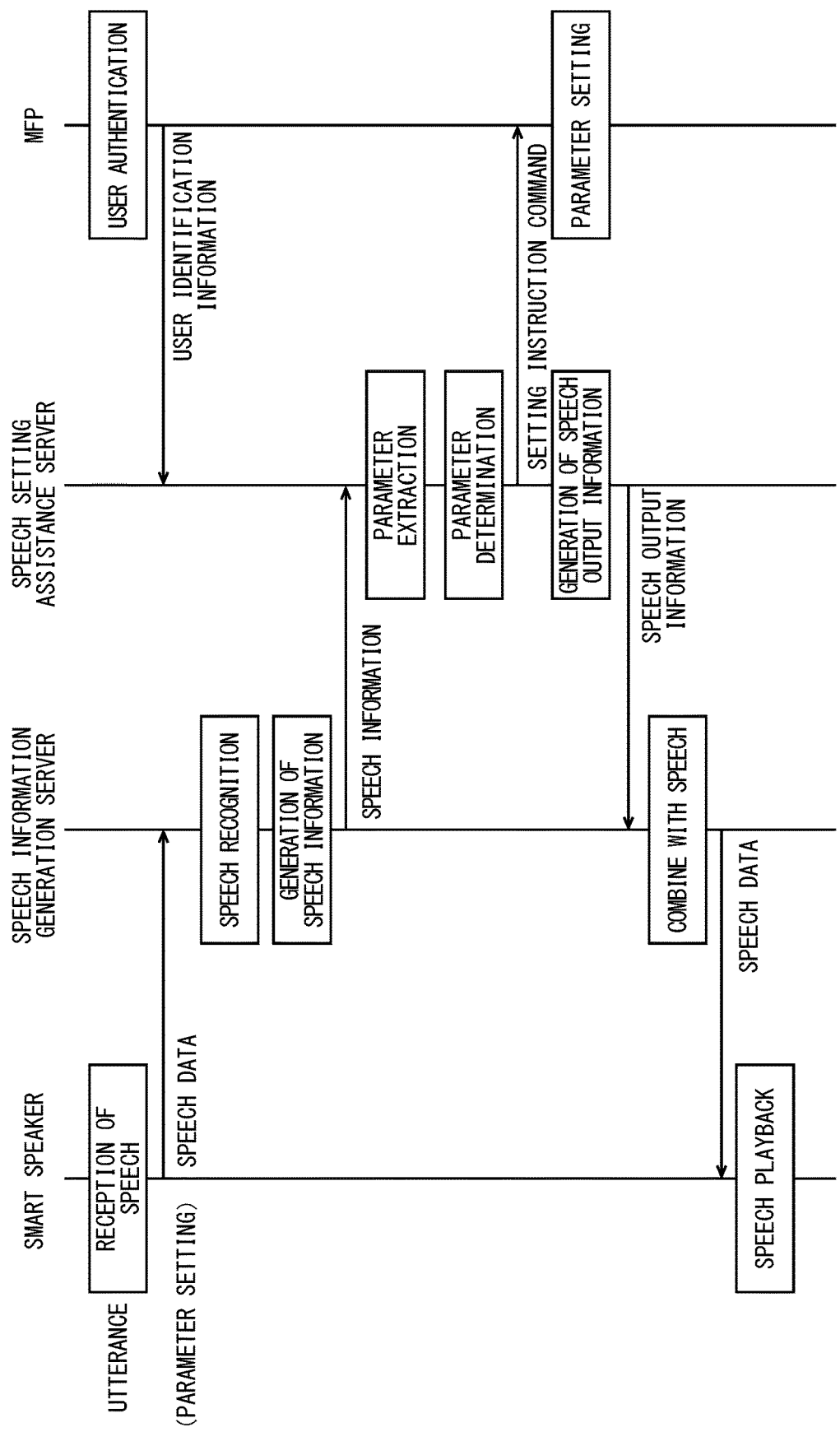
FIG. 4 is a first chart diagram showing one example of a flow of a speech setting process in the speech setting system.

FIG. 4 is a first chart diagram showing one example of a flow of a speech setting process in the speech setting system. Referring to FIG. 4, passage of time is indicated from above to below in a vertical direction, and a process of the smart speaker 400, a process of the speech information generation server 300, a process of the speech setting assistance server 200 and a process of the MFP 100 are shown in order from the left.

In the MFP 100, a user who operates the MFP 100 is authenticated. In the case where authenticating the user, the MFP 100 transmits user identification information for identifying the authenticated user to the speech setting assistance server 200. In the case where the user inputs a user ID and a password to the operation panel 160, the MFP 100 authenticates the user using the user ID and the password. Further, in the case where having a short-range wireless communication function referred to as RFID (Radio Frequency Identification), the MFP 100 may perform the short-range wireless communication with the portable information device 450, an IC card or the like carried by the user to authenticate the user. The short-range wireless communication can use communication in accordance with ISO/IEC 18092 standards. Further, in the case where having a card reader that reads a magnetic card, the MFP 100 may authenticate the user by reading the magnetic card carried by the user. Further, in the case where remotely operating the MFP 100 using the portable information device 450, the user who remotely operates the MFP 100 from the portable information device 450 is authenticated in the MFP 100. The user may be authenticated in the MFP 100 or may be authenticated in an external authentication server.

When the user speaks, a speech is converted into an electric signal in the smart speaker 400, and speech data representing the electric signal is transmitted to the speech information generation server 300.

In the speech information generation server 300, when the speech data is received, speech recognition is carried out, and the speech data is converted into character information. The speech information generation server 300 extracts information for controlling the MFP 100 from the character information corresponding to the speech uttered by the user with the use of keywords stored in advance in association with the MFP 100, and generates speech information including the extracted information. The speech information generation server 300 transmits the speech information and device identification information for identifying a smart speaker that has transmitted the speech data to the speech setting assistance server 200. The speech information includes one or more out of a plurality of parameters used for execution of a job by the MFP 100. A plurality of parameters may be extracted from one speech data. In this case, the speech information includes a plurality of parameters. The speech information generation server 300 generates speech information in which a plurality of parameters are arranged in the order of utterance of the parameters. Because the speech data represents a speech uttered by the user, the order of arrangement of character information extracted from speech data represents the order of utterance by the user. Thus, in the case where a plurality of parameters are extracted from the character information, the speech information generation server 300 generates character information in which the plurality of parameters are arranged in the order of extraction.

The speech setting assistance server 200 that receives speech information extracts parameters from the speech information, and determines the extracted parameters as parameters to be set in the MFP 100. In the case where extracting parameters from speech information, the speech setting assistance server 200 determines that the speech information includes a setting command for providing an instruction for setting the parameters, transmits a setting instruction command for providing an instruction for setting the parameters in the MFP 100 and generates speech output information for notifying the user of the content of setting. The speech output information includes the parameters determined to be set in the MFP 100.

The MFP 100 that receives the setting instruction command sets the parameters in accordance with the setting instruction command. The speech setting assistance server 200 transmits the generated speech output information to the speech information generation server 300. The speech information generation server 300 generates speech data in which the parameters included in the speech output information are combined with a speech and transmits the speech data to the smart speaker 400. The smart speaker 400 that receives the speech data converts the speech data into a speech and plays the speech. Thus, the user can confirm the parameters set in the MFP 100 by speech.

Figure 5:
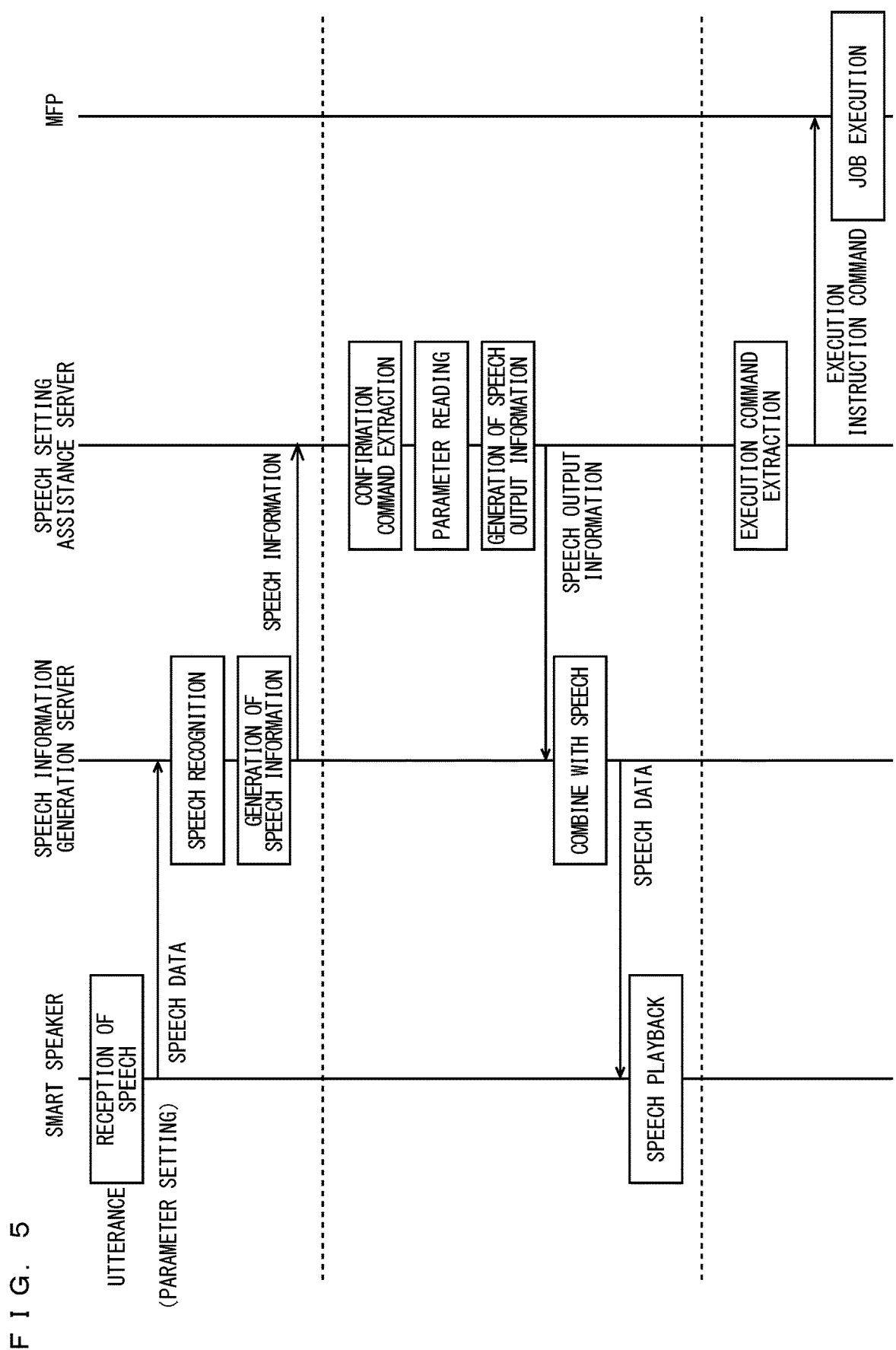
FIG. 5 is a second chart diagram showing the one example of the flow of the speech setting process in the speech setting system.

FIG. 5 is a second chart diagram showing one example of the flow of the speech setting process in the speech setting system. Referring to FIG. 5, after the user confirms the parameters set in the MFP 100, the parameters set in the MFP 100 are re-confirmed or an instruction for executing a job is provided to the MFP 100, by way of example. For example, in the case where the user utters speeches such as "Tell me the set parameters," "What is the content of setting?," "Confirm the content of setting," etc., a confirmation command for re-confirming is detected in the speech setting assistance server 200. Further, for example, in the case where the user utters speeches such as "Execute," "Print," "Execute a job," etc., an execution command is detected in the speech setting assistance server 200.

A speech uttered by the user is converted into an electric signal in the smart speaker 400, and speech data representing the electric signal is transmitted to the speech information generation server 300. The speech information generation server 300 recognizes a speech in the speech data, generates speech information and transmits the speech information to the speech setting assistance server 200.

In the case where extracting a confirmation command from the speech information, the speech setting assistance server 200 that receives the speech information reads out parameters set in the MFP 100. The speech setting assistance server 200 may read the parameters stored in the speech setting assistance server 200 or may inquire with the MFP 100 to acquire parameters transmitted from the MFP 100. The speech setting assistance server 200 generates speech output information for notifying the user of the content of setting. The speech output information includes the parameters set in the MFP 100.

The speech setting assistance server 200 transmits the generated speech output information to the speech information generation server 300. The speech information generation server 300 generates speech data in which the parameters included in the speech output information are combined with a speech and transmits the speech data to the smart speaker 400. The smart speaker 400 that receives the speech data converts the speech data into a speech and plays the speech. Thus, the user can re-confirm the parameters set in the MFP 100 by speech.

On the other hand, in the case where extracting an execution command from speech information, the speech setting assistance server 200 that receives the speech information transmits an execution instruction command for instructing the MFP 100 to execute a job to the MFP 100. When receiving the execution instruction command, the MFP 100 executes the job in accordance with set parameters. Thus, the user can confirm execution of the job by the MFP 100 by speech.

Figure 6:
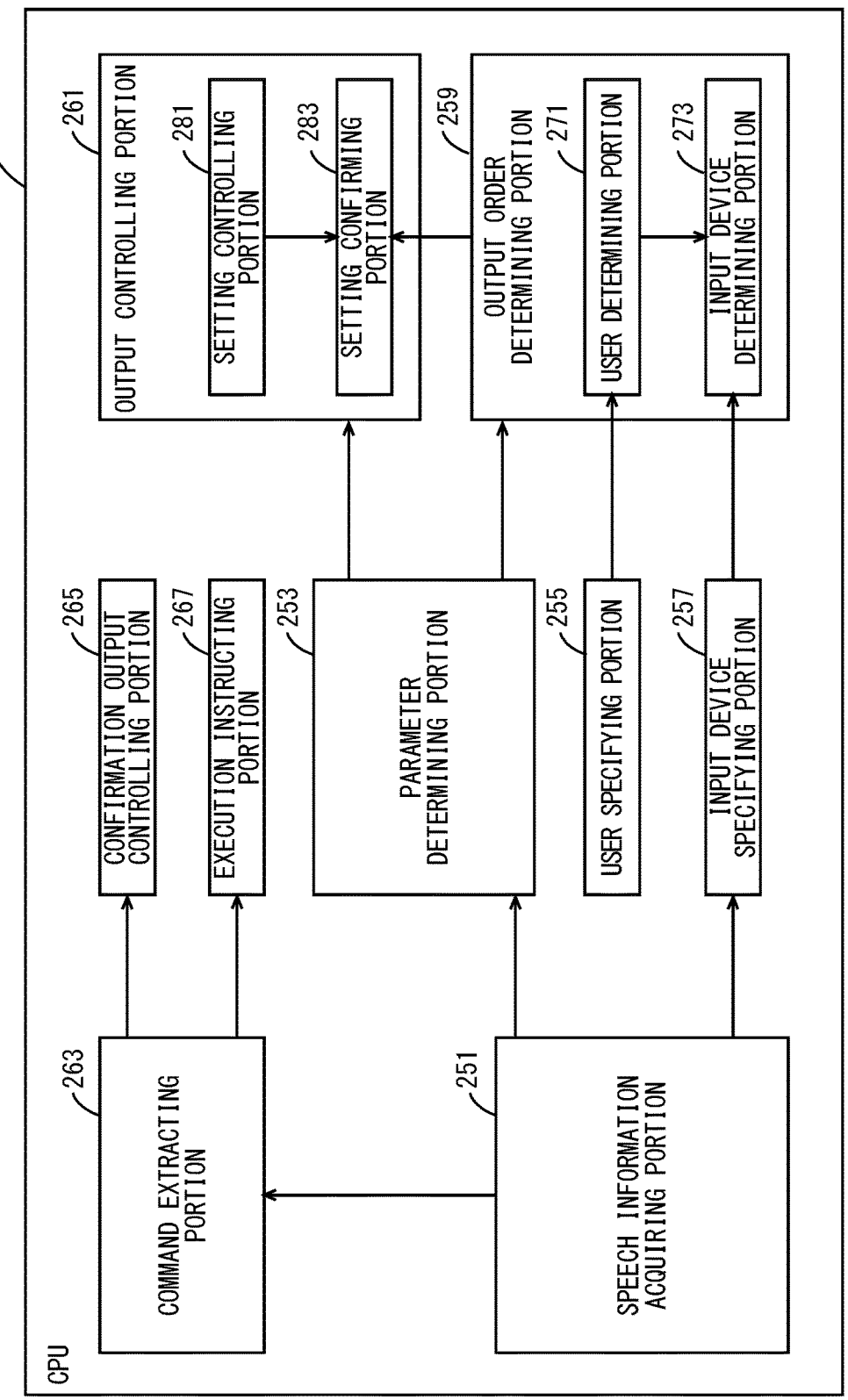
FIG. 6 is a block diagram showing one example of the functions of a CPU included in the speech setting assistance server.

FIG. 6 is a block diagram showing one example of the functions of the CPU included in the speech setting assistance server. The functions shown in FIG. 6 may be implemented in hardware or may be implemented in the CPU 201 in the case where the CPU 201 included in the speech setting assistance server 200 executes a program stored in the ROM 202, the HDD 204 or the CD-ROM 211. Here, a speech setting assistance program is executed by the CPU 201 included in the speech setting assistance server 200, by way of example.

Referring to FIG. 6, the CPU 201 included in the speech setting assistance server 200 includes a speech information acquiring portion 251, a parameter determining portion 253, a user specifying portion 255, an input device specifying portion 257, an output order determining portion 259, an output controlling portion 261, a command extracting portion 263, a confirmation output controlling portion 265 and an execution instructing portion 267.

The speech information acquiring portion 251 acquires speech information and device identification information received by the communication unit 205 from the speech information generation server 300. The speech information acquiring portion 251 outputs the speech information to the parameter determining portion 253 and the command extracting portion 263, and outputs the device identification information to the input device specifying portion 257. The speech information includes a command and a parameter. A command includes a setting command, a confirmation command and an execution command A parameter indicates a value settable for a setting item. A setting item indicates the type of parameter defined with respect to a job to be executed by the MFP 100.

The MFP 100 can execute a plurality of types of jobs. In the present embodiment, the plurality of types of jobs that are executable by the MFP 100 are a copy job of executing a copy process and a scan job of executing a scan process, by way of example. Further, the job type of a copy job is referred to as 'COPY,' and the job type of a scan job is referred to as 'SCAN.' In this case, 'COPY' and 'SCAN' are included as the keywords registered in the speech information generation server 300.

In the case where speech information acquired by the speech information acquiring portion 251 includes a setting command, the parameter determining portion 253 extracts a parameter from the speech information. In the case where speech information includes a parameter, it may be determined that the speech information includes a setting command. The parameter determining portion 253 extracts the parameter from the speech information with reference to a parameter table. For example, the parameter determining portion 253 extracts the same word as the word defined as a parameter in the parameter table from the speech information. Because a parameter is set to correspond to each of one or more setting items defined with respect to a job type, the parameter determining portion 253 determines a parameter corresponding to each of the one or more setting items. In the case where a plurality of parameters are included in one speech information piece, the parameter determining portion 253 extracts the plurality of parameters. The parameter determining portion 253 outputs the determined one or more parameters to the output order determining portion 259 and the output controlling portion 261.

FIG. 7 is a diagram showing one example of the parameter table. Referring to FIG. 7, the parameter table associates job types, setting items and parameters with one another. The parameter table includes a plurality of parameter records. A parameter record includes an item for a job type, an item for a setting item and an item for parameters. In the item for a job type, a job type is set. In the item for a setting item, the name of a setting item is set. In the item for parameters, a settable parameter is set.

In the case where 'COPY' is set in the item for a job type, there are seven parameter records, and the names of the setting items are 'COLOR,' 'SCAN,' 'PRINT,' 'STAPLE,' 'NUMBER OF COPIES,' 'TWO PAGES PER SHEET' and 'PAPER SIZE.'

In the case where the name of the setting item is 'COLOR,' the setting item corresponds to the parameters that define the number of colors for formation of images. As for the parameter record in which 'COLOR' is set as the name of the setting item, the item for parameters include three parameters: 'BLACK & WHITE,' 'AUTO COLOR' and 'FULL COLOR.' This indicates that one parameter out of 'BLACK & WHITE,' 'AUTO COLOR' and 'FULL COLOR' is settable with respect to the setting item 'COLOR.'

In the case where the name of the setting item is 'SCAN,' the setting item corresponds to the parameters that define the scan side of a document. As for the parameter record in which 'SCAN' is set as the name of the setting item, the item for parameters include two parameters: 'BOTH SIDES' and 'ONE SIDE.' The parameter 'ONE SIDE' indicates a parameter for scanning one side of a document, and the parameter 'BOTH SIDES' indicates a parameter for scanning both sides of a document.

In the case where the name of the setting item is 'PRINT,' the setting item corresponds to the parameters that define the side of a recording medium on which an image is to be formed. As for the parameter record in which 'PRINT' is set as the name of the setting item, the item for parameters include two parameters: 'BOTH SIDES' and 'ONE SIDE.' This indicates that one parameter out of both-sides print and one-side print is settable with respect to the setting item 'PRINT.'

In the case where the name of the setting item is 'STAPLE,' the setting item corresponds to the parameters that define the content of the process of stapling a plurality of papers. As for the parameter record in which 'STAPLE' is set as the name of the setting item, the item for parameters include three parameters: 'TWO LOCATIONS,' 'CORNER' and 'NONE.' This indicates that one parameter out of 'TWO LOCATIONS,' 'CORNER' and 'NONE' is settable as a parameter with respect to the setting item 'STAPLE.'

In the case where the name of the setting item is 'NUMBER OF COPIES,' the setting item corresponds to the parameters that define the number of papers on which images are to be formed. As for the parameter record in which 'NUMBER OF COPIES' is set as the name of the setting item, the item for parameters include numerals. This indicates that any number is settable as a parameter with respect to the setting item 'NUMBER OF COPIES.'

In the case where the name of the setting item is 'TWO PAGES PER SHEET,' the setting item corresponds to the parameters that define execution or non-execution of a process of forming two pages per sheet. As for the parameter record in which 'TWO PAGES PER SHEET' is set as the name of the setting item, the item for parameters includes two parameters: 'ON' and 'OFF.' This indicates that one parameter out of 'ON' and 'OFF' is settable with respect to the setting item 'TWO PAGES PER SHEET.'

In the case where the name of the setting item is 'PAPER SIZE,' the setting item corresponds to the parameters that define the size of a recording medium on which an image is to be formed. As for the parameter record in which 'PAPER SIZE' is set as the name of the setting item, the item for parameters includes four parameters: 'A4,' 'A3,' 'LETTER' and 'LEGER.' This indicates that any parameter from among 'A4,' 'A3,' 'LETTER' and 'LEGER' is settable with respect to the setting item 'PAPER SIZE.'

In the case where 'SCAN' is set in the item for a job type, there are six parameter records, and the names of the setting items are 'RESOLUTION,' 'DESTINATION,' 'COLOR,' 'SCAN SIZE,' 'SCAN' and 'FORMAT.'

In the case where the name of the setting item is 'RESOLUTION,' the setting item corresponds to the parameters that define resolution for scanning a document. As for the parameter record in which 'RESOLUTION' is set as the name of the setting item, the item for parameters includes four parameters: '200 dpi,' '300 dpi,' '400 dpi' and '600 dpi.' This indicates that any parameter out of '200 dpi,' '300 dpi,' '400 dpi' and '600 dpi' is settable with respect to the setting item 'COLOR.'

In the case where the name of the setting item is 'DESTINATION,' the setting item corresponds to the parameters that define output destination of the data that is obtained when a document is scanned. As for the parameter record in which 'DESTINATION' is set as the name of the setting item, the item for parameters includes names for the addresses of output destination. This indicates that the address of the output destination is settable as a parameter with respect to the setting item 'DESTINATION.'

In the case where the name of the setting item is 'COLOR,' the setting item corresponds to the parameters that define the number of colors for scanning a document. As for the parameter record in which 'COLOR' is set as the name of the setting item, the item for parameters include three parameters: 'BLACK & WHITE,' 'AUTO COLOR' and 'FULL COLOR.' This indicates that one parameter out of 'BLACK & WHITE,' 'AUTO COLOR' and 'FULL COLOR' is settable with respect to the setting item 'COLOR.'

In the case where the name of the setting item is 'SCAN SIZE,' the setting item corresponds to the parameters that define the size of a document. As for the parameter record in which 'SCAN SIZE' is set as the name of the setting item, the item for parameters includes four parameters: 'A4,' 'A3,' 'LETTER' and 'LEGER.' This indicates that any parameter out of 'A4,' 'A3,' 'LETTER' and 'LEGER' is settable with respect to the setting item 'SCAN SIZE.'

In the case where the name of the setting item is 'SCAN,' the setting item corresponds to the parameters that define the scan side of a document. As for the parameter record in which 'SCAN' is set as the name of the setting item, the item for parameters include two parameters: 'BOTH SIDES' and 'ONE SIDE.' This indicates that any parameter out of 'BOTH SIDE' and 'ONE SIDE' is settable with respect to the setting item 'SCAN.'

In the case where the name of the setting item is 'FORMAT,' the setting item corresponds to the parameters that define the format of image data acquired when a document is scanned. As for the parameter record in which 'FORMAT' is set as the name of the setting item, the item for parameters includes four parameters: 'Compact PDF,' 'PDF,' 'JPEG' and 'TIFF.' This indicates that one parameter out of 'CompactPDF,' 'PDF,' 'JPEG' and 'TIFF' is settable with respect to the setting item 'FORMAT.'

Returning to FIG. 6, the user specifying portion 255 specifies a user who operates the MFP 100. The user specifying portion 255 outputs user identification information for identifying the user who operates the MFP 100 to the output order determining portion 259. The user specifying portion 255 communicates with the MFP 100 and acquires the user identification information of the user who is authenticated by the MFP 100 from the MFP 100. In the case where the user inputs a user ID and a password to the operation panel 160, the MFP 100 authenticates the user using the user ID and the password. Further, in the case where having a short-range wireless communication function referred to as an RFID, the MFP 100 may authenticate the user by performing short-range wireless communication with the portable information device 450, an IC card or the like carried by the user. Further, in the case where having a card reader that reads a magnetic card, the MFP 100 may authenticate the user by reading a magnetic card carried by the user. Further, in the case where remotely operating the MFP 100 using the portable information device 450, the user who remotely operates the MFP 100 from the portable information device 450 is authenticated in the MFP 100.

In the case where receiving device identification information from the speech information acquiring portion 251, the input device specifying portion 257 determines a device specified by the device identification information, here, the smart speaker 400, as a device to which the user has input a speech. In response to receiving the device identification information from the speech information acquiring portion 251, the input device specifying portion 257 outputs the device identification information to the output order determining portion 259.

The output order determining portion 259 receives one or more parameters that are extracted by the parameter determining portion 253 from speech information. In the case where receiving a plurality of parameters from the parameter determining portion 253, the output order determining portion 259 determines the order of utterance of the plurality of parameters as output order. The output order determining portion 259 outputs the output order to the output controlling portion 261. The output order determining portion 259 includes a user determining portion 271 and an input device determining portion 273.

In the case where the user specified by the user identification information received from the user specifying portion 255 is not a predetermined specific type, the user determining portion 271 determines not the utterance order but default order as the output order. The default order is a predetermined order with respect to the plurality of setting items. The default order is defined based on a setting screen displayed in the MFP 100. Specifically, the default order is defined based on the relative positional relationship among a plurality of parameters arranged in the setting screen. The setting screen includes a plurality of parameters respectively corresponding to the plurality of setting items. For example, in the case where a plurality of parameters arranged in the setting screen are arranged in a horizontal direction, the default order is the order of arrangement of the plurality of parameters from the left to the right. Further, in the case where a plurality of parameters arranged in the setting screen are arranged in a vertical direction, the default order is the order in which the plurality of parameters are arranged from above to below. A setting screen displayed in the MFP 100 is defined for each of the plurality of job types. Here, in the MFP 100, a setting screen corresponding to a copy job the job type of which is 'COPY,' and a setting screen corresponding to a scan job the job type of which is 'SCAN' are defined. Thus, the output order determining portion 259 stores the output order of a plurality of parameters arranged in the setting screen in advance for each of the plurality of job types. In the case where arrangement of a plurality of parameters in the setting screen is changed in the MFP 100, the output order determining portion 259 determines default order based on arrangement of the plurality of parameters in the setting screen after the change. In that case, the output order determining portion 259 may acquire default order from the MFP 100 or may acquire the arrangement of the plurality of parameters in the setting screen from the MFP 100.

The specific type of user is a visually-impaired person, for example. Since an able-bodied person can confirm a setting screen displayed in the operation panel 160, in the case where a plurality of parameters are uttered in the default order, the able-bodied person can view the setting screen. Therefore, the user can easily compare the aurally obtained information with the visually obtained information. In the case where utterance order is different from default order, when a plurality of parameters are uttered in the default order, it is necessary to locate the uttered parameters in the setting screen. Therefore, it may take some time to compare the aurally obtained information with the visually obtained information. As such, an able-bodied person can compare the information more efficiently in the case where parameters are uttered in accordance with the positions displayed on the setting screen. On the other hand, it is easier for a visually-impaired person to confirm the content of setting in the case where parameters are uttered in the same order as the order of utterance of the plurality of parameters by the user himself or herself.

In the case where the user determining portion 271 determines default order as output order, when a device specified by device identification information received from the input device specifying portion 257 is assigned only to a user who is specified by the user specifying portion 255, the input device determining portion 273 determines not the default order but utterance order as the output order. The device assigned only to the user is the device carried by the user. In the present embodiment, the smart speaker 400 is arranged in the vicinity of the MFP 100 and collects a speech of any user. Therefore, the smart speaker 400 is not assigned to a user who operates the MFP 100. The portable information device 450 is a device carried by a user and assigned only to the user. A user table that associates a user and a device assigned only to the user may be stored in the speech setting assistance server 200 in advance.

The output controlling portion 261 receives one or more parameters from the parameter determining portion 253 and receives output order from the output order determining portion 259. The output controlling portion 261 includes a setting controlling portion 281 and a setting confirming portion 283.

The setting confirming portion 283 generates speech output information for outputting a plurality of parameters by speech in accordance with the output order and transmits the speech output information to the speech information generation server 300. When receiving the speech output information, the speech information generation server 300 causes a device that has transmitted speech data, in this case, the smart speaker 400, to play the speech output information by speech. Thus, the user can confirm by speech that the parameters uttered by the user himself or herself have been set in the MFP 100.

The setting controlling portion 281 causes the MFP 100 to set one or more parameters received from the parameter determining portion 253. In the case where different parameters are received from the parameter determining portion 253 at different times in regard to the same setting item, the setting controlling portion 281 updates a parameter that is received earlier with a parameter that is received later from the parameter determining portion 253. Specifically, the setting controlling portion 281 transmits a setting instruction command including one or more parameters to the MFP 100 and causes the MFP 100 to set the one or more parameters. The setting controlling portion 281 transmits a parameter for each of a plurality of setting items defined in regard to each of job types to the MFP 100. The setting controlling portion 281 does not transmit a parameter of a setting item that is not received from the parameter determining portion 253 to the MFP 100. The setting controlling portion 281 may acquire a parameter set in the MFP 100 from the MFP 100. As for a parameter of a setting item that is not received from the parameter determining portion 253, the setting controlling portion 281 may include the parameter acquired from the MFP 100 in a setting instruction command and transmit the setting instruction command The command extracting portion 263 receives speech information from the speech information acquiring portion 251 and extracts a command included in the speech information. Speech information includes a setting command, a confirmation command or an execution command. The command extracting portion 263 extracts a setting command in the case where speech information includes a parameter. In the case where extracting a confirmation command from speech information, the command extracting portion 263 outputs a confirmation instruction to the confirmation output controlling portion 265. In the case where extracting an execution command from speech information, the command extracting portion 263 outputs an execution instruction to the execution instructing portion 267.

In response to receiving a confirmation instruction, the confirmation output controlling portion 265 generates speech output information and transmits the speech output information to the speech information generation server 300. Specifically, the confirmation output controlling portion 265 reads a parameter set in the MFP 100. In the case where the parameter set in the MFP 100 is stored in the HDD 204, the confirmation output controlling portion 265 may read the parameter or may inquire with the MFP 100 and acquire the parameter transmitted from the MFP 100. The confirmation output controlling portion 265 generates speech output information for notifying a user of the parameter set in the MFP 100. The confirmation output controlling portion 265 transmits the generated speech output information to the speech information generation server 300. The speech information generation server 300 generates speech data in which the parameter included in the speech output information is combined with a speech and transmits the speech data to the smart speaker 400. The smart speaker 400 that receives the speech data converts the speech data into a speech and plays the speech. Thus, the user can re-confirm the parameter set in the MFP 100 by speech.

The confirmation output controlling portion 265 may generate speech output information not including a parameter that is not determined by the parameter determining portion 253 such that the parameter is not output by speech. In this case, because a parameter not uttered by a user is not output from the smart speaker 400, the user can confirm that only a parameter that is uttered by the user himself or herself is set correctly.

In response to receiving an execution instruction, the execution instructing portion 267 transmits an execution instruction command for providing an instruction for executing a job to the MFP 100. When receiving the execution instruction command, the MFP 100 executes a job in accordance with a set parameter. Thus, a user can cause the MFP 100 to execute a job by speech.

FIG. 8 is a diagram showing one example of a setting instruction command Referring to FIG. 8, a setting instruction command includes a job type and a plurality of parameters. "create_copyjob" in the setting command indicates that the job type is 'COPY.' "duplex": null in the setting instruction command indicates that a parameter is not set for the setting item 'SCAN.' "color": "full_color" in the setting instruction command indicates that the parameter 'FULL COLOR' is set in the setting item 'COLOR.' "number": "3" in the setting instruction command indicates that the parameter '3' is set in the setting item 'NUMBER OF COPIES.' "combine": "two pages per sheet" in the setting command indicates that the parameter 'ON' is set in the setting item 'TWO PAGES PER SHEET.'

Figure 9:
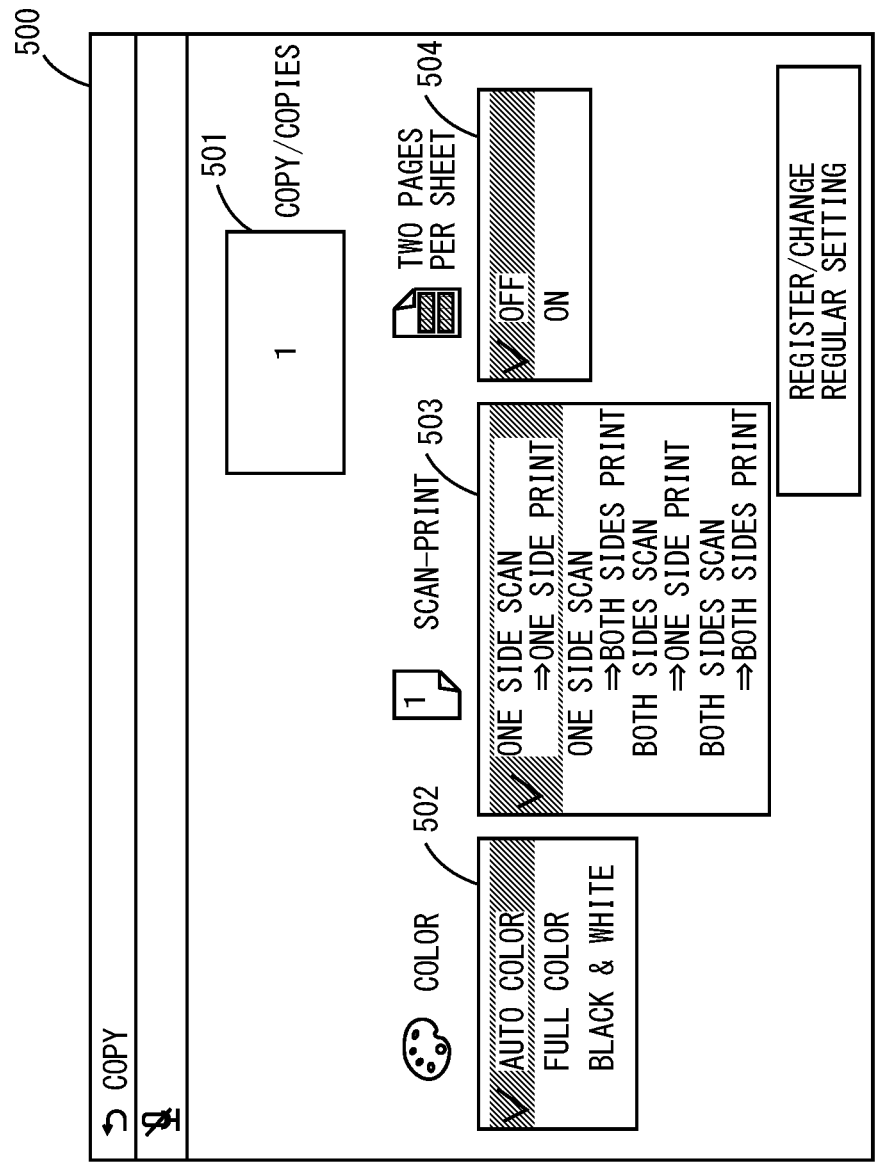
FIG. 9 is a first diagram showing one example of a setting screen.

FIG. 9 is a first diagram showing one example of a setting screen. FIG. 9 is the setting screen displayed in the display unit 161 in the case where the name of the job type is 'COPY.' Hatching is applied to the highlighted areas in the diagram. Referring to FIG. 9, a setting screen 500 includes regions 501 to 504 that display parameters. In the region 501, the parameter "1" is set for the setting item 'NUMBER OF COPIES.' In the region 502, three settable parameters are displayed for the setting item 'COLOR,' the set parameter is highlighted, and a symbol is provided at the left. Here, the parameter "AUTO COLOR" is set for the setting item 'COLOR. In the region 503, four settable parameters are displayed for the setting item 'SCAN-PRINT,' the set parameter is highlighted, and a symbol is provided at the left. Here, the parameter "ONE-SIDE" is set for the setting item 'SCAN' and the parameter "ONE-SIDE" is set for the setting item 'PRINT.' In the region 504, the two settable parameters are displayed for the setting item 'TWO PAGES PER SHEET,' the set parameter is highlighted, and a symbol is provided at the left. Here, the parameter "OFF" is set for the setting item 'TWO PAGES PER SHEET.'

Figure 10:
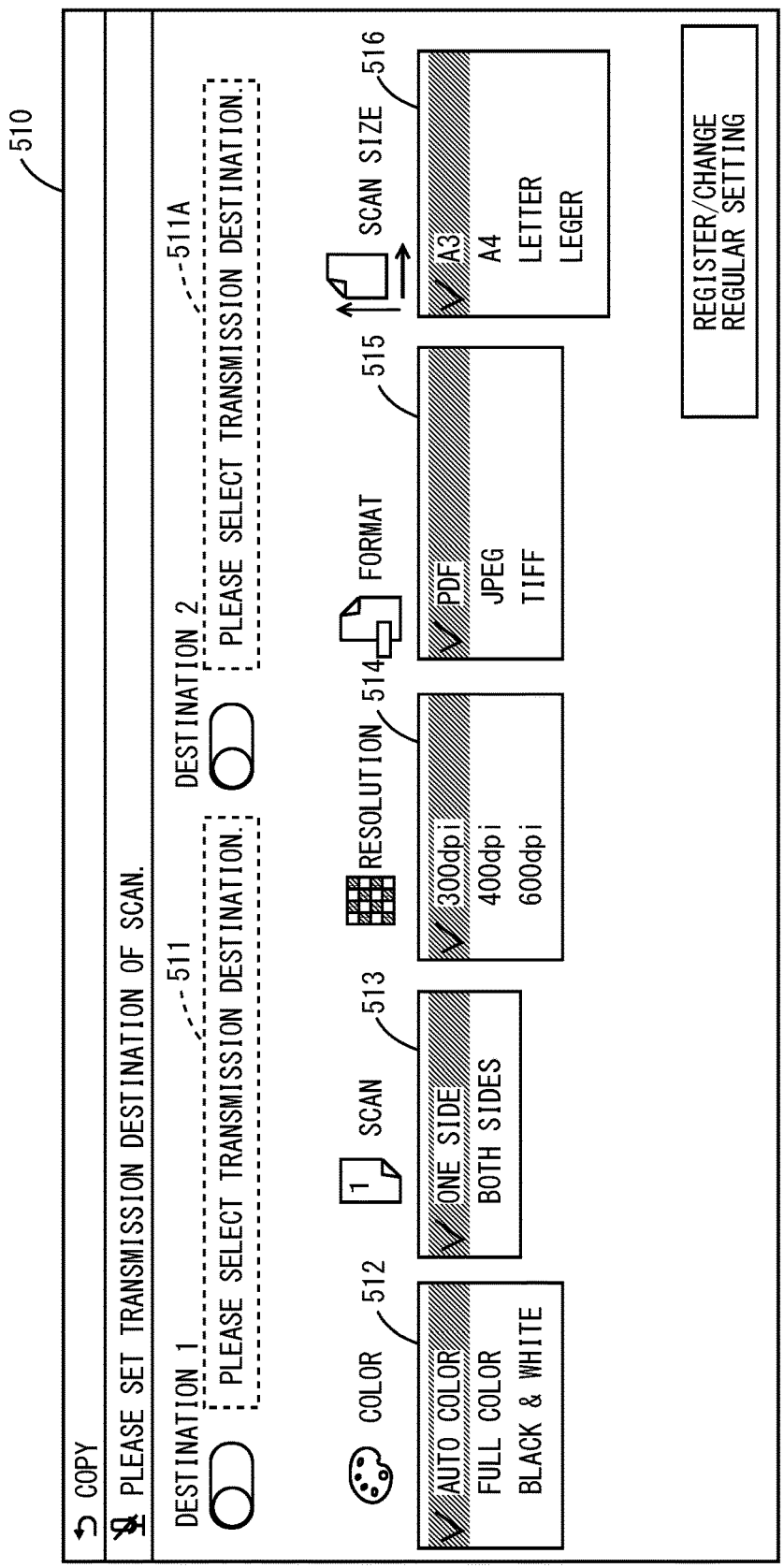
FIG. 10 is a second diagram showing one example of a setting screen.

FIG. 10 is a second diagram showing one example of the setting screen. FIG. 10 is a setting screen displayed in the display unit 161 in the case where the name of the job type is 'SCAN.' Hatching is applied to the highlighted areas in the diagram. Referring to FIG. 10, a setting screen 510 includes regions 511 to 516 that display parameters. A parameter set for the setting item 'DESTINATION' is input in each of regions 511, 511A. Here, a parameter is not set in either region. In the region 512, the three settable parameters are displayed in the setting item 'COLOR,' the set parameter is highlighted, and a symbol is provided at the left. Here, the parameter "AUTO COLOR" is set for the setting item 'COLOR.' In the region 513, the two settable parameters are displayed in the setting item 'SCAN,' the set parameter is highlighted, and a symbol is provided at the left. Here, the parameter "ONE SIDE" is set in the setting item 'SCAN.'

In the region 514, the three settable parameters are displayed in the setting item 'RESOLUTION,' the set parameter is highlighted and a symbol is provided at the left. Here, the parameter "300 dpi" is set in the setting item 'RESOLUTION.' In the region 515, the three settable parameters are displayed in the setting item 'FORMAT,' the set parameter is highlighted and a symbol is provided at the left. Here, the parameter "PDF" is set in the setting item 'FORMAT.' In the region 516, the four settable parameters are displayed in the setting item 'SCAN SIZE,' the set parameter is highlighted, and a symbol is provided at the left. Here, the parameter "A3" is set in the setting item 'SCAN SIZE.'

Figure 11:
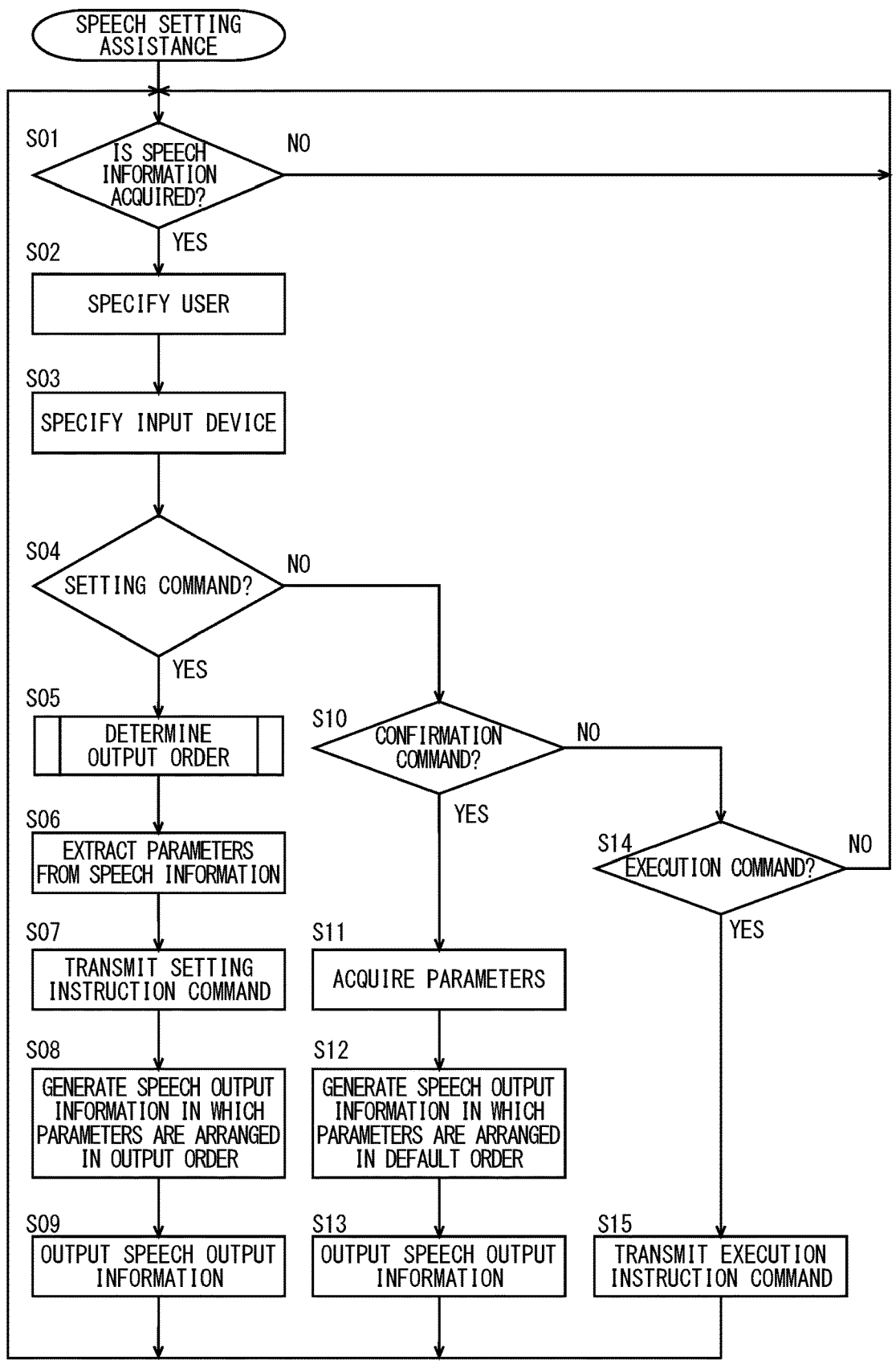
FIG. 11 is a flowchart showing one example of a flow of a speech setting assistance process.

FIG. 11 is a flowchart showing one example of a flow of a speech setting assistance process. The speech setting assistance process is a process executed by the CPU 201 in the case where the CPU 201 included in the speech setting assistance server 200 executes the speech setting assistance program stored in the ROM 202, the HDD 204 or the CD-ROM 211.

Referring to FIG. 10, the CPU 201 included in the speech setting assistance server 200 determines whether speech information has been acquired (step S01). In the case where speech information is received from the speech information generation server 300, the process proceeds to the step S02. If not, the process returns to the step S01. In the step S02, a user who operates the MFP 100 is specified, and the process proceeds to the step S03. The user who has logged into the MFP 100 is authenticated by the MFP 100. When user identification information of the user who is authenticated by the MFP 100 is received, the user is specified.

In the step S03, an input device is specified. A device that collects a user's speech is specified as the input device. In the present embodiment, one of the smart speaker 400 and the portable information device 450 is specified as the input device. Here, the smart speaker 400 is specified as the input device, by way of example.

In the step S04, whether the speech information acquired in the step S01 includes a setting command is determined. In the case where the speech information includes a parameter, it is determined that a setting command is included. In the case where the speech information includes a setting command, the process proceeds to the step S05. If not, the process proceeds to the step S10. In the step S05, an output order determination process is executed, and the process proceeds to the step S06. While the details will be described below, the output order determination process is a process of determining the order of output of a plurality of parameters by speech. In the step S06, parameters are extracted from the speech information, and the process proceeds to the step S07. In the step S07, a setting instruction command for setting the parameters extracted from the speech information in the step S06 is transmitted to the MFP 100, and the process proceeds to the step S08. In the step S08, speech output information in which the parameters extracted from the speech information in the step S06 are arranged in the output order determined in the step S05 is generated, and the process proceeds to the step S09. In the step S09, the speech output information is transmitted to the speech information generation server 300, and the process returns to the step S01.

For example, the user utters "Scan in 300 dpi, for one side and in auto color," by way of example. In this case, the setting screen 510 shown in FIG. 10 is displayed in the MFP 100. In the case where the user is visually impaired, speech output including a character string "Scan is set in 300 dpi, for one side and in auto color." is generated. Because hearing the parameters in the same order as the order of utterance of the plurality of parameters by the user himself or herself, the user can easily confirm the content of setting. In the case where the user is able-bodied, speech output including the character string "Scan is set in auto color, for one side and in 300 dpi." is generated. In the case where confirming the content of setting while viewing the setting screen 510 shown in FIG. 10 and hearing a speech, because being able to confirm the parameters arranged in order from the left in the setting screen 510 each time each of the plurality of parameters that are uttered in order is uttered by speech, the user can easily confirm the content of setting.

In the step S10, whether the speech information acquired in the step S01 includes a confirmation command is determined. In the case where the speech information includes a confirmation command, the process proceeds to the step S11. If not, the process proceeds to the step S14. In the step S11, the parameters set in the MFP 100 are acquired from the MFP 100, and the process proceeds to the step S12. In the step S12, speech output information in which the parameters acquired from the MFP 100 in the step S11 are arranged in the default order is generated, and the process proceeds to the step S13. In the step S13, the speech output information is transmitted to the speech information generation server 300, and the process returns to the step S01.

For example, in the case where the setting screen shown in FIG. 10 is displayed in the MFP 100, the speech output information including a character string "Currently, scan is set in auto color, of one side and in 300 dpi, the format is set to PDF, and the scan size is set to A3." is generated and transmitted to the speech information generation server 300. Because the character string included in the speech output information is output from the smart speaker 400, the user can easily confirm the content of setting while viewing the setting screen 510.

In the step S14, whether the speech information acquired in the step S01 includes an execution command is determined. In the case where the speech information includes an execution command, the process proceeds to the step S15. If not, the process returns to the step S01. In the step S15, an execution instruction command for instructing the MFP 100 to execute a job is transmitted to the MFP 100, and the process returns to the step S01. In the MFP 100 that receives an execution instruction, a job is executed in accordance with a set parameter.

Figure 12:
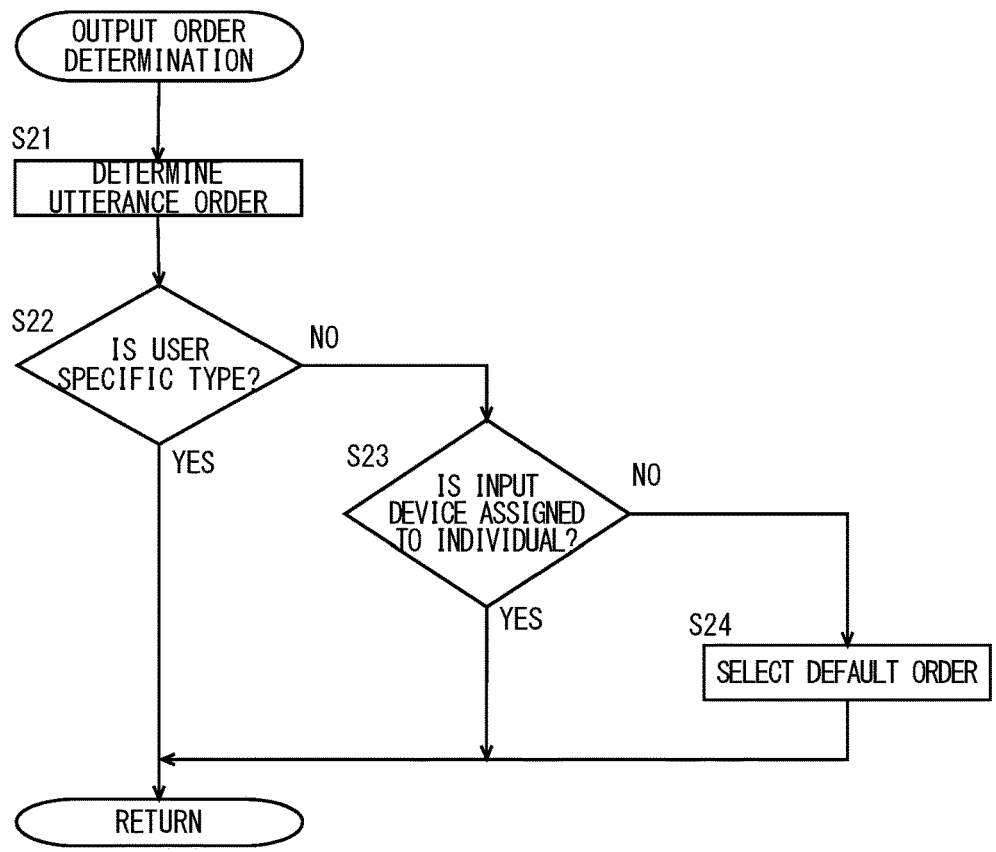
FIG. 12 is a flowchart showing one example of a flow of the output order determination process.

FIG. 12 is a flowchart showing one example of a flow of the output order determination process. The output order determination process is a process executed in the step S05 of the speech setting assistance process. Referring to FIG. 12, the utterance order is determined as the output order in the step S21, and the process proceeds to the step S22. In the step S22, whether the user who operates the MFP 100 is a specific type is determined. Here, the specific type is a visually-impaired person. In the case where the user is the specific type, the process returns to the speech setting assistance process. If not, the process proceeds to the step S23.

In the step S23, whether the input device is a device assigned to an individual is determined. Here, the input device is a device that collects a user's speech. In the case where the input device is the portable information device 450, it is determined that the input device is assigned to an individual, and the process returns to the speech setting assistance process. In the case where the input device is the smart speaker 400, it is determined that the device is not assigned to an individual, and the process proceeds to the step S24. In the step S24, the default order is determined as the output order, and the process returns to the speech setting assistance process.

First Modified Example

Figure 13:
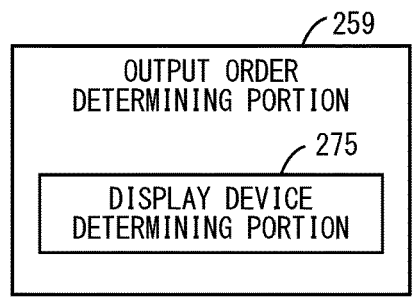
FIG. 13 is a block diagram showing one example of the detailed function of an output order determining portion in the first modified example.

In a first modified example, the output order determining portion 259 is changed. FIG. 13 is a block diagram showing one example of the detailed function of an output order determining portion in the first modified example. Referring to FIG. 13, the output order determining portion 259 in the first modified example includes a display device determining portion 275. In the case where a device operated by a user has a display device that displays a setting screen, the display device determining portion 275 determines the default order as the output order. In the case where a device operated by a user does not have a display device, the display device determining portion 275 determines the utterance order as the output order. In the present embodiment, because the MFP 100 displays a setting screen in the display unit 161, in the case where the user operates the MFP 100, the default order is selected.

Further, the display device determining portion 275 and the user determining portion 271 may be combined. In this case, in the case where it is determined that a user is the specific type, the output order determining portion 259 determines the utterance order as the output order. In the case where a user is not the specific type, and a device operated by the user has a display device, the output order determining portion 259 determines the default order as the output order. In the case where a user is not the specific type, and a device operated by the user does not have a display device, the output order determining portion 259 determines the utterance order as the output order.

Second Modified Example

Figure 14:
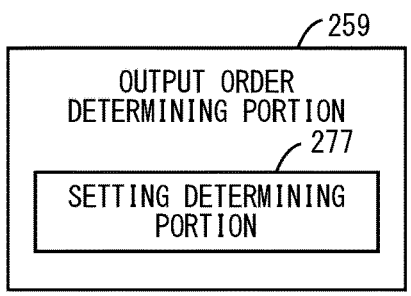
FIG. 14 is a block diagram showing one example of the detailed function of an output order determining portion in the second modified example.

In a second modified example, the output order determining portion 259 is changed. FIG. 14 is a block diagram showing one example of the detailed function of an output order determining portion in the second modified example. Referring to FIG. 14, the output order determining portion 259 in the second modified example includes a setting determining portion 277. The setting determining portion 277 sets one of the utterance order and the default order as the output order in advance in the speech setting assistance server 200. For example, the output order is set by a user who administers the MFP 100.

Third Modified Example

While a job is generated in the MFP 100 by way of example in the above-mentioned speech setting system 1, a job to be executed by the MFP 100 may be generated in the speech setting assistance server 200. This can reduce a load on the MFP 100.

In the speech setting system 1 in the present embodiment as described above, the speech setting assistance server 200 functions as a speech setting assistance device, the MFP 100 functions as a job execution device, the speech information generation server 300 functions as a speech recognition device, and the smart speaker 400 and the portable information device 450 function as a speech input device.

The speech setting assistance server 200 determines parameters respectively corresponding to a plurality of setting items based on speech information obtained from a speech, determines utterance order of the plurality of parameters as output order, and outputs speech output information for outputting the plurality of parameters determined in correspondence with the plurality of setting items in the output order. Therefore, because the parameters uttered by speech for setting are played in the utterance order, the user can easily confirm that the parameters uttered by the user himself or herself for setting are set correctly.

Further, the speech setting assistance server 200 acquires speech information from the speech information generation server 300, and determines the order of determination of a plurality of parameters defined by the speech information as the utterance order. Thus, the utterance order is determined easily.

Further, the speech setting assistance server 200 specifies a user who operates the MFP 100. In the case where the specified user is an able-bodied person, the speech setting assistance server 200 determines not the utterance order but the default order that is predetermined with respect to a plurality of parameters as the output order. For example, in the case where the user is a visually-impaired person, because a plurality of parameters are played in the utterance order, the user can easily confirm the set parameters. Further, in the case where the user is an able-bodied person, because a plurality of parameters are played in the default order, a plurality of parameters displayed in the display screen can be compared with the plurality of parameters uttered by speech. Thus, the user can easily confirm the parameters. Therefore, because the output order differs depending on whether a user is a visually-impaired person, parameters can be efficiently compared for each of a visually-impaired person and an able-bodied person.

Further, in the case where a user who operates the MFP 100 is an able-bodied person, and the user inputs a speech to the portable information device 450 assigned only to the user, not the default order but the utterance order is determined as the output order. In the case where the user inputs a speech to the portable information device 450, the portable information device 450 may be pressed against a user's ear, and the user may remotely operate the MFP 100 from the portable information device 450. In this case, the user cannot view a setting screen displayed in the MFP 100. Because a plurality of parameters are played in the utterance order in a situation where the user cannot visually confirm the setting screen, the user can easily confirm the set parameters. On the other hand, because a plurality of parameters are played in the default order in a situation where the user can visually confirm the set parameters, the user can compare the set parameters with the visually confirmed parameters and the aurally confirmed parameters. Therefore, the user can easily confirm whether the parameters are set correctly.

Further, in the case where the speech setting assistance server 200 specifies a user who operates the MFP 100, and the smart speaker 400 that is not assigned only to the user collects a user's speech, a plurality of parameters are played in accordance with not the utterance order but the default order. Therefore, because the plurality of parameters are played in the default order in a situation where the user who views a setting screen displayed in the MFP 100 can visually confirm set parameters, the user can compare the parameters set in the setting screen with the parameters that are played by speech. Therefore, the user can easily confirm whether the parameters are set correctly.

Further, the default order is defined based on the relative positional relationship, on a setting screen, among a plurality of parameters arranged in the setting screen. Thus, when confirming set parameters while viewing a setting screen, a user can easily confirm positions in the setting screen of the parameters corresponding to parameters played by speech.

Further, in the case where the MFP 100 does not have the display unit 161, the speech setting assistance server 200 determines not default order but utterance order as output order. Therefore, a user can easily confirm whether parameters are set correctly.

Further, in the case where speech information includes a setting command, the speech setting assistance server 200 transmits speech output information for outputting a plurality of parameters in accordance with utterance order in response to acquisition of the speech information. In the case where speech information includes a confirmation command, the speech setting assistance server 200 transmits speech output information for outputting a plurality of parameters in accordance with not utterance order but default order to the speech information generation server 300. Therefore, in the case where a user confirms a plurality of parameters set in the MFP 100, the plurality of parameters are played in accordance with default order. Therefore, the user can easily confirm the plurality of parameters set in the MFP 100.

While the speech setting system 1 and the speech setting assistance server 200 included in the speech setting system 1 are described in the present embodiment, it is needless to say that the present invention can be specified as the speech setting assistance method for causing the speech setting assistance server 200 to execute the speech setting assistance process shown in FIG. 11.

Although embodiments of the present invention have been described and illustrated in detail, the disclosed embodiments are made for purpose of illustration and example only and not limitation. The scope of the present invention should be interpreted by terms of the appended claims.

What is claimed is:

1. A speech setting system comprising:
a job execution device that executes a job for which a plurality of parameters are set in accordance with the plurality of parameters, and
a speech setting assistance device, the speech setting assistance device comprising a hardware processor, wherein the hardware processor is configured to:
determine the plurality of parameters based on speech information obtained from a speech,
determine utterance order of the plurality of parameters as output order, and
output speech output information for outputting the plurality of parameters by speech in accordance with the output order.

2. The speech setting system according to claim 1, wherein
the hardware processor
acquires the speech information externally, and
determines order of determination of the plurality of parameters defined by the speech information as the utterance order.

3. The speech setting system according to claim 1, wherein
the hardware processor
specifies a user who operates the job execution device, and
in the case where the specified user is not a predetermined specific type of user, determines default order that is predetermined with respect to the plurality of parameters as the output order.

4. The speech setting system according to claim 3, further comprising a speech input device to which a speech uttered by the user is input, wherein
the hardware processor, in the case where the specified user is not the specific type of user and the speech input device is not assigned only to the specified user, determines the default order as the output order.

5. The speech setting system according to claim 3, wherein
the specific type of user is a user with visual impairment.

6. The speech setting system according to claim 3, wherein
the job execution device further includes a display that displays a setting screen in which the plurality of parameters are arranged, and
the default order is defined based on a relative positional relationship, on the setting screen, among the plurality of parameters arranged on the setting screen.

7. The speech setting system according to claim 6, wherein
the hardware processor, in the case where the job execution device does not have a display, determines not the default order but the utterance order as the output order.

8. The speech setting system according to claim 3, wherein
the hardware processor,
in the case where the acquired speech information provides an instruction for setting the parameters, outputs the speech output information in response to acquisition of the speech information, and
in the case where the acquired speech information provides an instruction for confirming content of setting, outputs the speech output information for outputting the plurality of parameters by speech in accordance with not the utterance order but the default order.

9. The speech setting system according to claim 3, wherein
the hardware processor determines the utterance order as the output order in the case where output in the utterance order is set, and determines the default order as the output order in the case where output in the utterance order is not set.

10. The speech setting system according to claim 1, further comprising a speech input device to which a speech uttered by a user is input, wherein
the hardware processor
specifies the user who operates the job execution device, and
in the case where the speech input device is not assigned only to the specified user, outputs the speech output information for outputting the plurality of parameters by speech in accordance with default order that is predetermined with respect to the plurality of parameters.

11. The speech setting system according to claim 1, wherein
the job execution device is an image processing apparatus.

12. The speech setting system according to claim 1, wherein
the speech setting assistance device generates the job based on the plurality of parameters.

13. The speech setting system according to claim 1, further comprising a speech recognition device that recognizes a speech uttered by a user and generates the speech information.

14. A speech setting assistance device that sets parameters in a job execution device that executes a job for which the plurality of parameters are set in accordance with the plurality of parameters, the speech setting assistance device comprising a hardware processor, wherein the hardware processor is configured to:
determine the plurality of parameters based on speech information obtained from a speech,
determine utterance order of the plurality of parameters as output order, and
output speech output information for outputting the plurality of parameters by speech in accordance with the output order.

15. A non-transitory computer-readable recording medium encoded with a speech setting assistance program which, when executed by a computer, controls a speech setting assistance device, the speech setting assistance device configured to set a plurality of parameters in a job execution device that executes a job for which the plurality of parameters are set in accordance with the plurality of parameters, the speech setting assistance program causing the computer to perform:
- a parameter determining step of determining the plurality of parameters based on speech information obtained from a speech;
- an output order determining step of determining utterance order of the plurality of parameters as output order; and
- an output control step of outputting speech output information for outputting the plurality of parameters by speech in accordance with the output order.

\* \* \* \* \*